United States Patent Office 3,038,932
Patented June 12, 1962

3,038,932
PREPARATION OF ORTHO-AMINOBENZENE-SULFONIC ACIDS
William B. Hardy, Bound Brook, and Tsai H. Chao, Somerville, N.J., assignors to American Cyanamid Company, New York, N.Y., a corporation of Maine
No Drawing. Filed July 2, 1958, Ser. No. 746,070
4 Claims. (Cl. 260—508)

This invention relates to an improved process for preparing ortho-aminosulfonic acids from thiophenols and disulfides, and sulfones from monosulfides and sulfoxides containing free amino groups.

The preparation of ortho-aminosulfonic acids of the benzene and diphenyl series has presented serious problems in the past. There has been no simple cheap way of making these compounds, which are of technical importance especially in the dyestuff field. It has been customary to prepare the compounds by reducing the corresponding ortho-nitrobenzenesulfonic acids. This process has not been very economical because the acids are not readily available and require expensive processes for preparation.

A direct oxidation process of producing sulfanilic acid by oxidizing p,p'-diaminodiphenyl disulfide with potassium permanganate was described more than sixty years ago. This process gave relatively poor yields and has remained a laboratory curiosity. All attempts to oxidize o,o'-diaminodiphenyl disulfides have failed and there is no practical direct process available today for producing the ortho-aminosulfonic acids.

According to the present invention, o,o'-diaminodiphenyl disulfides are oxidized with hydrogen peroxide in relatively strong sulfuric acid medium. In a similar manner, ortho-aminobenzenethiols or orthoaminothiophenols are oxidized to produce the same products. It is surprising that the amino groups are not attacked by the hydrogen peroxide in the present process, as it had been considered in the prior art that an amino compound could not be oxidized with hydrogen peroxide without protecting the amino group, for example, by acylation.

The nature of the acid in the present invention, although not its concentration, is extremely critical. Only sulfuric acid can be used and when it is attempted to use glacial acetic acid, a much more common medium for hydrogen peroxide oxidations, nothing but tarry products result. Just why the hydrogen peroxide does not attack the amino group in the sulfuric acid solution, whereas it apparently does in the glacial acetic acid solution is not known. No theoretical limitations to a particular reaction mechanism are postulated.

The production of ortho-aminosulfonic acids of the benzene and diphenyl series by the present invention can be effected over a fairly wide temperature range. It will proceed as low as 15° C. and as high as 110° C. However, at temperatures below 40° C. the reaction is so slow that it becomes economically less attractive and above 60° C. decreased purity and other undesirable effects begin to become noticeable. Therefore, the preferred range is from 40° C. to 60° C.

The molar ratios of sulfuric acid to disulfide or sulfuric acid to thiol are not critical. However, the best ranges are different in the case of the two compounds. Thus, for the thiols, molar ratios from 10:1 to 7:1 are preferred, whereas for the disulfides, 14:1 to 19:1 are used. Ratios above and below are workable, but the results are not as good as in the preferred ranges which therefore constitute a more specific aspect of the invention.

The strength of the aqueous solution of hydrogen peroxide employed is not at all critical. However, of course, the solution must not be so dilute that excessive dilution of the sulfuric acid results. In general, commercially available hydrogen peroxide solutions approximating 30% strength, give excellent results and are preferred. The amount of hydrogen peroxide may also be varied. The theoretical amount which, of course, will be less for the thiols than for the disulfides on a molecular basis, constitutes a minimum. However, it is desirable to use an excess as the reaction is more easily controlled and optimum speed and other results are obtained. Thus, it is preferred to use at least about 3 moles per mole of thiol or 5 moles per mole of disulfide. There is no definite upper limit except the practical one of excessive acid dilution and the economic one of excessive cost. Since no improvement in yields and other benefits are obtained if the range from 3 to 4 moles hydrogen peroxide per mole of thiol or 5 to 6 moles per mole of disulfide is exceeded, these ranges are preferred.

It has been pointed out above that there is a limit on the amount of dilution of the sulfuric acid. In general, the sulfuric acid concentration after dilution with the water of the hydrogen peroxide solution should not drop below 75%, and acid strengths up to 100% are useful. For best results, acid strengths between 80% and 100% are preferred, and where the preferred ranges of hydrogen peroxide strength and amount are employed, it is possible to obtain acids of satisfactory strengths, starting out with ordinary commercial concentrated sulfuric acid of from 95% to 98% strength. This constitutes an additional practical operating advantage for the preferred modification. It might be thought at first glance that there would be advantage in using sulfuric acid of greater than 100% strength, i.e., oleum, since this would permit greater flexibility in dilution. However, it is undesirable to use acid of such high strength, as the purity of the resulting product suffers and in some cases the yield is adversely affected.

When lower temperatures are used, that is, not above 40° C., the present invention lends itself to the production of amino sulfones from amino monosulfides or sulfoxides. By this modification, a wide variety of sulfones can be prepared in which the amino group does not necessarily have to be ortho to the sulfide or sulfoxide group. Also, it is not necessary that there be two ortho-amino groups and various unsymmetrical sulfones can be prepared.

Turning to the modification of the invention in which ortho-aminosulfonic acids are produced, the benzene rings carrying the amino and the disulfide or thiol group may be substituted. Thus, for example, there may be alkyl groups, halogen groups, alkoxy groups, other amino groups, and, of course, when the ortho-aminosulfonic acids of the diphenyl series are to be prepared, the benzene ring containing the amino and the sulfur-containing groups will also be substituted by aryl to form the diphenyl structure. The starting compounds may be represented by the following generic formula:

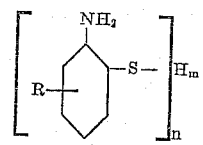

where R represents radicals of the group consisting of hydrogen, alkyl, aryl, alkoxy, halogen and amino, n has a value of 1 or 2, and m has a value of 1 where n is 1 and a value of 0 where n is 2.

Typical disulfides and thiols are the following:

o,o'-Diaminodiphenyl disulfide
5,5'-dimethyl-2,2'-diaminodiphenyl disulfide
p,p'-Dimethoxy-o,o'-diaminodiphenyl disulfide
p,p'-Dichloro-o,o'-diaminodiphenyl disulfide
2,2',5,5'-tetraminodiphenyl disulfide 3,3'-diaminobis(4-biphenylyl)disulfide
o-Aminobenzenethiol
2-amino-5-methoxybenzenethiol
2-amino-5-methylbenzenethiol In the case in which the monosulfides and sulfoxides are oxidized to sulfones, various combinations of substituents may be present in the starting materials. The generic formula of the starting materials may be represented as follows:

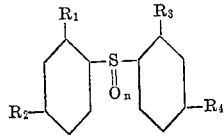

where $R_1$, $R_2$, $R_3$ and $R_4$ may be hydrogen, amino, nitro, alkyl, aryl, alkoxy and halogen, with at least one R being an amino group.

Typical sulfides and sulfoxides are the following:

4,4'-diaminodiphenyl sulfide
2,2'-diaminodiphenyl sulfide
2,4'-diaminodiphenyl sulfide
4-aminodiphenylsulfide
4-amino-4'-nitrodiphenyl sulfide
4-amino-2'-nitrodiphenyl sulfide
2,2'-diamino-4-nitrodiphenyl sulfide
4,4'-diamino-2,2'-dimethyldiphenyl sulfide
2-amino-4'-methyldiphenyl sulfide
4,4'-diamino-2-methoxydiphenyl sulfide
4-amino-4'-methoxydiphenyl sulfide
2,2'-diamino-4,4'-dichlorodiphenyl sulfide
4,4'-diaminodiphenyl sulfoxide
4-amino-4'-nitrodiphenyl sulfoxide The invention will be illustrated by the following specific examples in which the parts are by weight unless otherwise specified.

*Example 1*

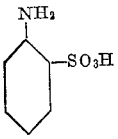

To a solution of 32.6 parts of o,o'-diaminodiphenyl disulfide in 220 parts of 97% sulfuric acid there are added slowly with stirring and cooling 80 parts of 30% hydrogen peroxide while maintaining the reaction temperature below 60° C. When the addition is complete and the mixture has cooled to 25° C., 250 parts of water are added, and the resulting dispersion is cooled to 25° C. and filtered. The product is purified by crystallization from water and treatment with animal charcoal. The yield is very good.

*Example 2*

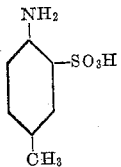

The procedure of Example 1 is repeated replacing the o,o'-diaminodiphenyl disulfide with 5,5'-dimethyl-2,2'-diaminodiphenyl disulfide, using 36.2 parts instead of 32.6 parts.

*Example 3*

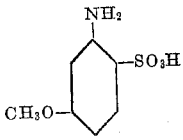

The procedure of Example 1 is repeated replacing the o,o'-diaminodiphenyl disulfide with 40.5 parts of p,p'-dimethoxy-o,o'-diaminodiphenyl disulfide.

*Example 4*

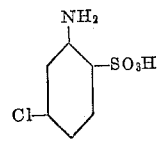

The procedure of Example 1 is repeated replacing the o,o'-diaminodiphenyl disulfide with 41.7 parts of o,o'-diamino-p,p'-dichlorodiphenyl disulfide.

*Example 5*

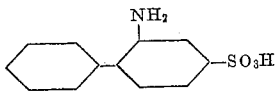

Procedure of Example 1 is repeated replacing the o,o'-diaminodiphenyl disulfide with 52.5 parts of 3,3'-diaminobis(4-biphenylyl)disulfide.

*Example 6*

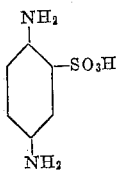

Procedure of Example 1 is repeated replacing the o,o'-diaminodiphenyl disulfide with 36.5 parts of 2,2',5,5'-tetraminodiphenyl disulfide.

*Example 7*

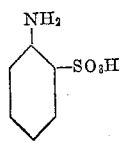

To a solution of 25.0 parts of o-aminobenzenethiol in 250 parts of 97% sulfuric acid there are added slowly with stirring and cooling 90 parts of 30% hydrogen peroxide while maintaining the reaction temperature below 65° C. When the addition is complete and the mixture has cooled to 25° C., 280 parts of water are added, and the resulting dispersion is cooled to 25° C. and filtered. The product is purified by crystallization from water and treatment with animal charcoal.

*Example 8*

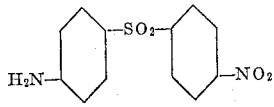

In a suitable vessel 12.3 parts (0.05 mole) of 4-amino-4'-nitrodiphenyl sulfide are dissolved in about 90 parts of 96–97% sulfuric acid while keeping the temperature at approximately 30° C. by external cooling. With the temperature held at 30° C., 12.5 parts of 30% hydrogen peroxide are added slowly. After further stirring for 3.5 hours at 30° C., the reaction mixture is poured into a mixture of ice and water, and the crystalline precipitate is separated by filtration and washed with water on the filter. Recrystallization of the product from hot 15% hydrochloric acid and washing with water give a product which melted at 165–169° C.

*Example 9*

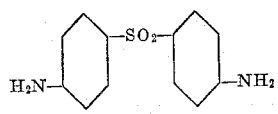

Procedure of Example 8 is repeated replacing the 4-amino-4'-nitrodiphenyl sulfide with 31.4 parts of monosulfate of 4,4'-diaminodiphenyl sulfide, 185 parts of 96–97% sulfuric acid and 25 parts of 30% hydrogen peroxide. Instead of recrystallizing from hot hydrochloric acid, the final recrystallization is effected from alcohol and a product is obtained which when tested with a known pure sample by mixed melting point showed no depression.

*Example 10*

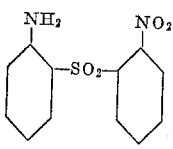

Procedure of Example 8 is repeated replacing the 4-amino-4'-nitrodiphenyl sulfide with the same amount of 2-amino-2'-nitrodiphenyl sulfide. The product is obtained in good yield and good purity.

*Example 11*

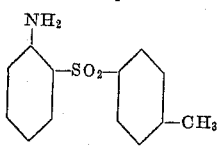

Procedure of Example 8 was repeated replacing the 4-amino-4'-nitrodiphenyl sulfide with 10.8 parts of 2-amino-4'-methyldiphenyl sulfide. A good yield of pure product was obtained.

*Example 12*

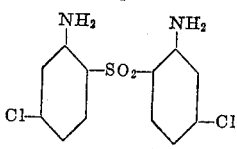

Procedure of Example 9 is repeated replacing the sulfate of the 4,4'-diaminodiphenyl sulfide with 28.5 parts of 2,2'-diamino-4,4'-dichlorodiphenyl sulfide. A good yield of the desired product is obtained.

*Example 13*

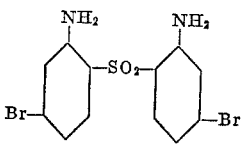

Example 12 is repeated replacing the 2,2'-diamino-4,4'-dichlorodiphenyl sulfide with its stoichiometrical equivalent (0.10 mole) of the corresponding dibromo compound. A good yield of a product of high purity is obtained.

*Example 14*

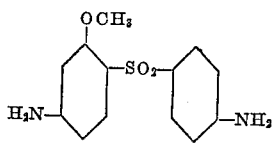

Example 9 is repeated replacing the 4,4'-diaminodiphenyl sulfide with stoichiometrical equivalent (0.1 mole) of 4,4'-diamino-2-methoxydiphenyl sulfide. The desired product is obtained in good yield and good purity.

*Example 15*

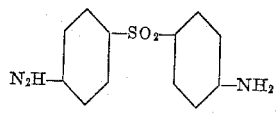

Example 8 is repeated using 11.6 parts of 4,4'-diaminodiphenyl sulfoxide and 6.25 parts of the 30% hydrogen peroxide solution. It should be noted that since the starting material, the sulfoxide, already contains one of the two oxygen atoms needed in the final sulfone, the amount of hydrogen peroxide is cut in half. The product is obtained in good yield and is the same as that obtained in Example 8.

We claim:

1. A process of preparing an o-amino-benzenesulfonic acid which comprises reacting at a temperature of from about 15° C. to about 110° C. (*a*) about one mol part of a compound of the formulae:

(I)

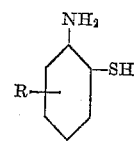

and (II)

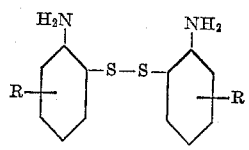

wherein R is a member of the group consisting of hydrogen, methyl, methoxy, phenyl, chlorine, bromine and amino; (*b*) from about one to about six mol parts of aqueous hydrogen peroxide, and (*c*) aqueous sulfuric acid having a concentration of from about 75% to about 100%, the mol ratio of sulfuric acid to said compound being from about 7:1 to about 10:1 for compounds of Formula I and from about 14:1 to about 19:1 for compounds of Formula II.

2. A process according to claim 1 in which the temperature is from 40–60° C.

3. A process according to claim 1 in which the sulfuric acid has a concentration of 85–100%.

4. A process according to claim 1 for preparing a compound of the formula:

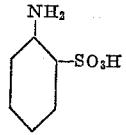

in which said compound is o,o'-diaminodiphenyl disulfide.

References Cited in the file of this patent

Wagner et al.: "Synthetic Organic Chemistry," 2nd ed. (1953), pp. 801 and 812–813 relied on. (Copy in Div. 38.)

Kambara et al.: "Chem. Abs.," vol. 46, page 1795g (1952). (Copy in U.S. Pat. Sci. Lib.)

UNITED STATES PATENT OFFICE
CERTIFICATE OF CORRECTION

Patent No. 3,038,932            June 12, 1962

William B. Hardy et al.

It is hereby certified that error appears in the above numbered patent requiring correction and that the said Letters Patent should read as corrected below.

Column 6, lines 5 to 9, the formula should appear as shown below instead of as in the patent:

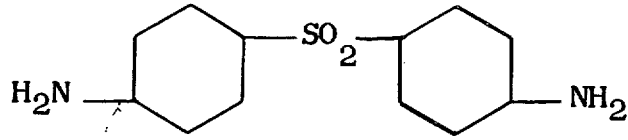

Signed and sealed this 25th day of September 1962.

(SEAL)
Attest:

ERNEST W. SWIDER
Attesting Officer

DAVID L. LADD
Commissioner of Patents